United States Patent [19]

Nishio et al.

[11] Patent Number: 4,985,495

[45] Date of Patent: Jan. 15, 1991

[54] RESIN COMPOSITION

[75] Inventors: Takeyoshi Nishio, Okazaki; Shinichi Yamauchi, Yokkaichi; Yusuke Arashiro, Yokkaichi; Kenyu Ohno, Yokkaichi; Masuzo Yokoyama, Yokkaichi; Hiroshi Nakano, Yokkaichi; Hiroshi Ohmori, Yokkaichi; Junji Mayumi, Yokkaichi; Michiharu Kihira, Yokkaichi, all of Japan

[73] Assignees: Toyota Jidosha Kabushiki Kaisha, Aichi; Mitsubishi Petrochemical Co., Ltd., Tokyo, both of Japan

[21] Appl. No.: 289,035

[22] Filed: Dec. 23, 1988

[30] Foreign Application Priority Data

Dec. 25, 1987 [JP] Japan .................................. 62-329060

[51] Int. Cl.$^5$ ..................... C08L 49/00; C08L 53/00; C08L 71/12
[52] U.S. Cl. ....................................... 525/68; 525/92; 525/250; 525/263; 525/316; 525/323; 525/905
[58] Field of Search ............................ 525/68, 92, 905

[56] References Cited

U.S. PATENT DOCUMENTS

| | | | |
|---|---|---|---|
| 4,460,743 | 7/1984 | Abe et al. | 525/68 |
| 4,647,594 | 3/1987 | de Munck et al. | 525/92 |
| 4,801,645 | 1/1989 | Nishio et al. | 525/68 |
| 4,914,153 | 4/1990 | Toop et al. | 525/905 |

FOREIGN PATENT DOCUMENTS

| | | |
|---|---|---|
| 49-075663 | 7/1974 | Japan . |
| 49-032660 | 9/1974 | Japan . |
| 58-141239 | 8/1983 | Japan . |

*Primary Examiner*—Jacob Ziegler
*Attorney, Agent, or Firm*—Oblon, Spivak, McClelland, Maier & Neustadt

[57] ABSTRACT

Disclosed is a polymer alloy consisting essentially of a composition of a polyphenylene ether, a crystalline propylene resin, and an alkenyl aromatic monomer modified propylene-dialkenylbenzene compound copolymer. The composition excels in heat resistance and resistance to oils.

12 Claims, No Drawings

RESIN COMPOSITION

BACKGROUND OF THE INVENTION

1. Field of the Invention

The present invention relates to a resin composition which excels in moldability, mechanical strength, impact strength, and the like. More particularly, the present invention concerns a molding material which is capable of satisfying requirements for high-level performance in use as structural members of automobiles, electrical appliances, etc. wherein improvements are made with respect to a decline in impact strength, which is generally liable to occur in a mixture of incompatible resins, without substantially impairing heat resistance and mechanical strength, i.e., the characteristic features of a polyphenylene ether resin, and moldability and organic solvent resistance, i.e., the characteristic features of a polypropylene resin by blending a polyphenylene ether resin, a polypropylene resin and a particular styrene monomer modified propylene copolymer.

2. Description of the Prior Art

It is well known that polyphenylene ether resins comprising phenylene groups having non-substituted or substituted rings, particularly poly-2,6-dimethyl-1,4phenylene ether, excel in heat resistance and mechanical strength and are useful as the so-called engineering resin, but that such polyphenylene ether resins also possess the undesirable property that their moldability is poor in injection molding or the like due to their high melt viscosities. In addition, their impact strength and solvent resistance as the heat-resistant engineering resin are still insufficient in many fields of application.

The idea is well known that, as an attempt in a case where desired various properties cannot be sufficiently satisfied by an individual resin material, insufficient properties are compensated for by blending that resin material with other resin materials. A material (U.S. Pat. No. 3,383,435) in which the moldability of a polyphenylene ether is improved by blending the polyphenylene ether with polystyrene which is compatible therewith and has good moldability has found widespread commercial use. With this material, however, both components have relatively poor resistance to organic solvents, and a blended composition thereof has insufficient solvent resistance. Since polypropylene resins excel in moldability, resistance to organic solvents and the like, have low specific gravities, and are low-priced, resins of this type are widely used for molded articles. However, their heat resistance is not very high, which is a drawback in their application as an engineering resin.

If a composition which has good properties of polyphenylene ether resin and polypropylene resin and is capable of compensating for undesirable aspects thereof can be obtained, it is possible to provide an excellent resin material having wide fields of application.

However, as can be understood in thermodynamic considerations of general polymer blends, since polyphenylene ether and polypropylene are incompatible and do not have affinity with each other, if the two components are simply mixed, the interface of the two-phase structure exhibited by the composition has poor adhesion. The two-phase interface of moldings obtained has low strength and therefore becomes a defective part, possibly resulting in a reduction in the mechanical strength and impact strength. In addition, the two phases are difficult to assume a form of uniform and fine dispersion, and delamination is liable to occur when it is subjected to shear stress at the time of molding such as injection molding.

Generally, one conceivable method for overcoming the above-described problems in a incompatible polymer blend is to compound a third component to a targeted two-component composition to improve the affinity. An agent which is called a compatibilizer is a typical example of the third component. Japanese Pat. Publication No. 7069/1967 discloses a composition in which a small amount of polyphenylene ether is mixed with polypropylene so as to improve the tension resistance and impact strength. However, this composition is insufficient to satisfy the harmony of the various properties which the present invention aims to attain. In addition, since improvements have not been essentially made on the affinity of the two components, it is difficult to cause excellent properties to be revealed by compounding a large quantity of polyphenylene ether. In the specification of U.S. Pat. No. 4,383,082, it is described that a block or radial teleblock copolymer of an alkenyl aromatic compound and a conjugated diene functions as a "compatibility imparting agent", and that polyolefin can be blended with polyphenylene ether uniformly at a considerably high ratio. However, no affinity improving agent effective for a combination of polypropylene resin and polyphenylene ether resin is suggested therein. In addition, although it is stated in Japanese Pat. Publication No. 22344/1981 that modified polypropylene is compounded with a polyphenylene ether. However, this reference merely discloses a method of preventing a decline in the mechanical strength occurring at the time when unmodified polypropylene is used by compounding one in which a styrene monomer is graft modified with polypropylene using organic peroxides.

The present inventors conducted research on improvements on a composition comprising a polyphenylene ether resin and a polypropylene resin so as to allow the composition to display the properties of the component resins, such as the heat resistance of the polyphenylene ether resin, the moldability and organic solvent resistance of the polypropylene resin, etc. with a good balance and to overcome a decline in the performance due to the poor affinity of two components, particularly the impact strength, which is a general demerit of the above-described incompatible blending materials.

As a result of the research, the present invention has been devised on the basis of the discovery that a propylene-dialkenylbenzene compound copolymer modified with an alkenyl aromatic monomer, obtained by allowing an alkenyl aromatic monomer and a polymerization initiator to coexist with a crystalline propylene-dialkenylbenzene compound copolymer, which is obtained by a copolymerization of propylene as a major component with a small quantity of dialkenylbenzene compound, is very effective as affinity improving agents for a composition comprising a polyphenylene ether resin and a polypropylene resin.

SUMMARY OF THE INVENTION

Accordingly, an object of the present invention is to provide a resin composition which excels in impact resistance, heat resistance and resistance to organic solvents, thereby overcoming the above-described drawbacks of the conventional art.

To this end, according to the present invention, there is provided a resin composition consisting essentially of the following components (a), (b) and (c): (a) 30 to 70 parts by weight of a resin comprising 40 to 100 wt% of a polyphenylene ether resin and 0 to 60 wt% of a styrene resin; (b) 30 to 70 parts by weight of a crystalline propylene resin; and (c) 1 to 40 parts by weight of a modified propylene-dialkenylbenzene compound copolymer with respect to a total of 100 parts by weight of the components (a) and (b) which is polymerized by using a Ziegler-Natta catalyst and obtained by subjecting an alkenyl aromatic monomer to copolymerization with a copolymer whose dialkenylbenzene compound content is 0.001 to 10 wt% in the presence of a polymerization initiator. The resin composition in accordance with the present invention excels in impact strength, heat resistance and resistance to organic solvents.

DETAILED DESCRIPTION OF THE INVENTION

Component (a): Polyphenylene Ether Resin

Polyphenylene ether resins used in the present invention are publicly known. Namely, a polyphenylene ether of this type can be obtained by polymerizing one or more kinds of phenol or a substituted phenol compound. A substituted phenol compound is a compound in which a part of hydrogen bonded to a phenyl ring is substituted by halogen atom, a hydrocarbon group, a halogen hydrocarbon group, or a hydrocarbon oxy group. As typical monomers, it is possible to cite the following: phenol, o-, m-, or p-cresol, 2,6-, 2,5-, 2,4-, or 3,5-dimethylphenol, 2-methyl6-phenyl-phenol, 2,6-diphnylphenol, 2,6-diethylphenol 2,3,5-, 2,3,6- or 2,4,6-trimethylphenol, and 2-methyl-6-t-butylphenol. Methods of producing these polymers are known, as disclosed in the specifications of U. S. Pat. Nos. 3,306,874, 3,306,875, 3,257,357, and 3,257,358.

Catalysts used in polymerization are not particularly restricted, any catalyst which is capable of obtaining a desired degree of polymerization may be used. In this field, many catalyst systems including cuprous salt-amine, cupric salt-amine-alkali metal hydroxide, and manganate-primary amine are known. Furthermore, it is possible to use a polymer in which a part of a polymer component has been modified by a catalyst component and a polymerization solvent component or by heat or oxygen during the manufacturing or forming process. The range of the degree of polymerization is not particularly restricted, but, as a preferable index in the light of moldability, a polymer whose intrinsic viscosity in a chloroform solution at 30° C. is 1.0 de/g or thereabout is an upper limit, preferably 0.1–0.9, and more preferably 0.2–0.8.

In addition, it is also possible to use a polymer in which one of the aforementioned compounds is used as a main component and a multivalent hydroxy aromatic compound such as a bisphenol A, tetrabromobisphenol A, resorcin, hydroquinon 2,2'-bis(3,5-dimethyl-4-hydroxy)propane, bis(3,5-dimethyl-4-hydroxy)methane, and 4,4'-dihydroxybiphenyl is used as a copolymer component. In addition, it is also possible to use a polymer in which alkenyl aromatic polymer has been grafted onto the polymer, as disclosed in Japanese Pat. Publication Nos. 47862/1972 and 12197/1973. Preferable among those are polymers consisting of poly-2,6-dimethyl-1,4-phenylene ether, and a copolymer of a large amount of 2,6-dimethyl phenol and a small amount of one or more monomers selected from 2,3,6trimethyl phenol, o- or p-cresol, 2,2'-bis(3,5-dimethyl-4hydroxy)propane, and 3,3', 5,5'-tetramethyl-4,4'-dihydroxybisphenyl. The degree of polymerization should be preferably such that the intrinsic viscosity of the polymer in a 30° C. chloroform is 0.2–0.8 de/g. If the degree of polymerization is too high, the melt viscosity is too high, so that it is compelled to perform molding at a higher temperature. Hence, a special device is required, and it becomes necessary to take special means for prevention of thermal degradation. In addition, if the degree of polymerization is too low, the mechanical strength declines.

In the present invention, a polyphenylene ether resin may be mixed with a 60 wt.% or less of styrene resin. As a styrene resin, it is possible to cite polystyrene, such rubber-reinforced polystyrene as high impact polystyrene, poly-α-methylstyrene, polymethylstyrene, styrene-maleic anhydride copolymer, styrene-phenylmaleimide copolymer, styrene-(metha)acrylate copolymer, styrene-butadiene copolymer, styrene-acrylonitrile copolymer, or ABS resin. By mixing a styrene resin, it is possible to lower the melt viscosity of a polyphenylene ether resin, and the moldability of the composition can be improved as a result. However, as the ratio of mixing of the styrene resin increases, heat resistance generally declines.

It should be noted that as a styrene resin used at the above-described predetermined ratio of mixing with a polyphenylene ether resin, it is also possible to employ an ungrafted polymer of an alkenyl aromatic monomer which is produced at the time of production of component (c) which will be described below.

Component (b): Crystalline Propylene Resin

Polypropylene resins used in the present invention are also publicly known. It is possible to use a polypropylene (propylene homopolymer), a propylene-ethylene copolymer or a propylene-α-olefin copolymer in which the degree of crystallization is 5% or more, preferably 10% or more. The copolymers are of propylene units as a majority (wt%) of amount. As an α-olefin, it is possible to use α-olefin with a carbon number of 4 to 8, preferably one or two or more kinds selected from the group consisting of 1-butane, 1-pentane, 1-hexane, 3-methyl-butane-1, 3-methl-pentane-1, and 4-methyl-pentane-1. Furthermore, it is possible to use a propylene-ethylene copolymer or propylene-α-olefin copolymer containing 20 wt% or less, preferably, 10 wt% or less, as a termonomer. It is possible to use as a termonomer a vinyl aromatic compound such as styrene and methylstyrene, a vinyl silane component such as vinyltrimethoxysilane and vinyltriethoxysilane, an unsaturated fatty acid and derivatives thereof such as maleic acid, maleic anhydride, acrylic acid, and methacrylic acid, and a unconjugated diene compound such as dicyclopentadiene, 4-ethylidene-2-norbornene, and 4-methyl1,4-hexadiene. Furthermore, as the aforementioned polypropylene, propylene-ethylene copolymer, or propylene-α-olefin copolymer, it is possible to use a mixture with polyethylene or other α-olefin polymer wherein the propylene content in the mixture is 30 wt% or more, preferably 50 wt% or more, and the degree of crystallization derived from a propylene unit is 5% or more, preferably 10% or more. As a preferable α-olefin polymer which is referred to herein, it is possible to cite polybutane-1, poly-4-methylpentene-1, ethylene-propylene or ethylene-propylene-butene copolymer. The polyethylene content is 50% or less, and one or two or more kinds of such as ethylene-butene copolymer. The polyethylene and α-olefin copolymer may be produced jointly in the polymerization process of the propylene resin, or may be blended with any of the components prior to the blending of the final composition. Alternatively, the polyethylene and α-olefin copolymer may be added simultaneously during the blending of final ingredients. As preferable polypropylene resins, it is possible to cite polypropylene, and a propylene-ethylene block copolymer wherein the propylene content is 99 to 70 wt%, a propylene-ethylene random copolymer wherein the propylene content is 99.9 to 80 wt%, polypropylene or the aforenmentioned propylene-ethylene copolymer blended with ethylene-propylene rubber or ethylene-butene rubber wherein the rubber content is 1 to 30 wt%. In order to set the heat resistance of the final resin composition to a high level, the degree of crystallinity and the crystal melting temperature of the polypropylene resin should preferably be as high as possible. In a propylene copolymer, as the proportion of a component copolymerized with propylene increases or the proportion of the α-olefin polymer increases, it is possible to reinforce the impact strength of the final composition, but, on the other hand, this results in a decline in the melting temperature due to a decrease in the propylene units. It is therefore essential to select an appropriate polypropylene resin in view of an equilibrium in these properties required of the final composition.

Component (c):Alkenyl Aromatic Monomer Modified Propylene-Dialkenyl Benzene Compound Copolymer An alkenyl aromatic monomer modified propylene-dialkenyl benzene compound copolymer used in the present invention can generally be obtained by the following processes (i) and (ii):

(i) First, a crystalline propylene-dialkenyl benzene compound copolymer containing 0.001 to 10 wt% of a dialkenyl benzene compound copolymerized using a Ziegler-Natta catalyst.

(ii) Subsequently, an alkenyl aromatic monomer is polymerized in the presence of the alkenyl aromatic monomer and a polymerization initiator to manufacture a modified propylene-dialkenyl benzene compound copolymer.

A detailed description will be given hereafter.

(1) Production of Propylene-Dialkenyl Benzene Compound Copolymer

A dialkenyl benzene compound used in the present invention is one expressed by a structural formula shown below, and any of o-, m-, and p-type isomers may be used and a mixture may be used. In addition, various types of derivatives in which a benzene ring is substituted may be used.

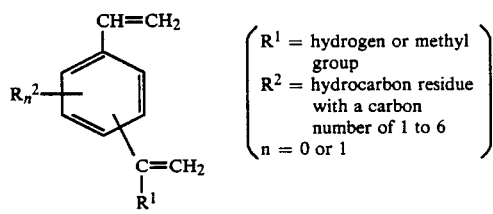

$R^1$ = hydrogen or methyl group
$R^2$ = hydrocarbon residue with a carbon number of 1 to 6
n = 0 or 1

To illustrate specific examples, such dialkenyl benzene compounds include divinyl benzene, isopropenylstyrene, divinyl toluene, divinyl naphthalene, and diisopropenyl benzene. Divinylbenzene is preferably used. Although ethylvinylbenzene, diethylbenzene and the like are also contained in commercially available crude divinylbenzene, but the crude divinylbenzene can be used without especially separating them. Copolymerization can be effected in a manner similar to that for effecting the conventional Ziegler-Natta type polymerization. In the so-called solvent polymerization in which an inert diluent is used, it is possible to use hydrocarbon solvents including hexane, heptane, cyclohexane, benzene, toluene, and xylene, and, as for the polymerization temperature the polymerization can be effected at a temperature of 0° C. to 120° C. preferably 20° C. to 90° C. The polymerization pressure can be varied widely. Hydrogen can be used as a molecular weight regulating agent for a copolymer.

A Ziegler-Natta catalyst used in the present invention comprises a combination of a know transition-metal compound of Group IV in the Periodic Table (halide, alkoxide, and acetylacetonate) and an organometallic compound of Groups I to III of the Periodic Table. Typical of these transition-metal compounds are compounds of titanium, vanadium and zirconium. To give a more detailed description as for titanium, they are titanium compounds such as $TiCl_4$, $TiCl_n(OR)_{4-n}$ (n=0—4), $TiCl_3 \cdot mAlCl_3$ (m=0—⅓) and compounds thereof are supported on magnesium chloride. In addition, those in which these transition-metal compounds have been modified with electron donor compounds may be used.

As organometallic compounds of Groups I to III of the Periodic Table are those including lithium, sodium, magnesium and aluminum having at least one carbon-metal bond and are expressed by general formulae: RLi, $RpMgX_{2-p}$, $AlRqX_{3-q}$ (R is a hydrocarbon residue of aliphatic, alicyclic or aromatic series, p=1 or 2, q=1 to 3).

Specifically, it is possible to cite ethyllithium, n-propyllithium, isopropyllithium, n-buthyllithium, sec-butyllithium, tert-buthyllithium, n-decyllithium, phenyllithium, benzyllithiunm, 1-naphthyllithium, p-tolyllithium, cyclohexyllithium, α-methylstyryllithium, sodium naphthalene, ethylmagnesium chloride, butylmagnesium, dibutylmagnesium chloride, triethylaluminum, triisobutylaluminum, trihexylaluminum, diethylaluminum chloride, diisobutylaluminum chloride, and diisobutylaluminum hydride.

These organometallic compounds can also form Ziegler-Natta catalysts by being combined with transition-metal compounds and electron donor compounds as a catalyst modifier.

Although there is no particular limitation to the amount of use of the aforementioned organometallic compounds and transition-metal compounds, these compounds are generally sued in the range of 0.5 to 500 (molar ratio).

Propylene is copolymerized with a dialkenylbenzene compound by using a ziegler-Natta catalyst thus formed. Copolymerization should be carried out in such a manner that the content of the copolymerized dialkenylbenzene compound in the copolymer is 0.001 to 10 wt%, preferably 0.05 to 5 wt%. If this content is excessively large, gelation is liable to occur, and if excessively small, the efficiency of modification reaction in a later stage declines. The content of the dialkenylbenzene compound is generally controlled by such as the amount of the dialkenylbenzene compound added, the rate of addition, its concentration in a polymerizing system of propylene, a polymerization temperature, and a polymerization time. Although the state of distribution of the presence of the dialkenylbenzene compound in the propylene copolymer is unknown, it is appropriate to suppose that it is distributed randomly. The propylene copolymer may be copolymerized with ethylene or α-olefin as a third component. As for the α-olefin copolymer components that may be used, it is possible to cite butene-1, pentene-1, 3-methyl-butene-1, hexene-1, 4-methyl-pentene-1, 3-ethyl-butene-1, and 3,3'-dimethyl-butene-1. Insofar as the alkenyl aromatic monomer modified propylene-dialkenylbenzene compound copolymer obtained in the following process (ii) possesses an affinity improving effect, the form of the copolymer concerned is not restricted, but preferably possess crystallinity derived from the propylene component. More preferably, the content of the propylene component in the copolymer is 50 wt% or more, and the copolymer should display crystallinity.

(ii) Modification of Propylene-Dialkenylbenzene Compound Copolymer Due to Alkenyl Aromatic Monomer Alkenyl aromatic monomers that are used include styrene, α-methylstyrene, (o, m, p)-methylstyrene, (o, m, p)-chlorostyrene, and (o, m, p)-alkylstyrene. As for alkyl groups, it is possible to select one or two or more kinds from among a compound having a carbon number of 2 to 6, (o-, m-, p-) divinylbenzene, (o-, m-, p-)diisopropenylbenzene. Preferably, styrene, a mixture of sytrene and α-methylstyrene, a p-methylstyrene, or a mixture of styrene and (o, m, p)-chlorostyrene is used wherein the propylene-dialkenylbenzene compound copolymer modified thereby possesses good affinity with a polyphenylene ether resin.

Modification is effected by allowing an alkenyl aromatic monomer and a polymerization initiator for the monomer to coexit with the propylene-dialkenylbenzene compound copolymer and under the conditions of polymerization of the monomer. Although the details of the mechanism of modification are not clear, but it is considered that an alkenyl structure which is derived from dialkenylbenzene and is not involved in copolymerization remains in the propylene-dialkenylbenzene compound copolymer, and that the alkenyl group has polymerizability in the same way as an alkenyl aromatic monomer. In addition, it is considered that the alkenyl aromatic monomer which is added to the polymerization conditions is copolymerizable with an alkenyl structure in the coexisting propylene-dialkenylbenzene compound copolymer. Accordingly, it is estimated that a resultant modified propylene copolymer undergoes the so-called graft modification with a polymer consisting of the alkenyl aromatic monomer.

As for an index of the degree of modification, it is possible to use a modification ratio, expresses as a percentage $\{(b)/(a) \times 100\}$, wherein (b) means the weight of a polymer of alkenyl aromatic monomers, which is graft bonded to a copolymer, weight, (a) of propylene and a dialkenylbenzene compound. Specifically, a ratio of the amount of the polymer (b) of the bonded alkenyl aromatic monomers to the amount of the copolymer (a) of propylene and dialkenyl benzene compound in insoluble matter obtained by extracting and separating a polymer subjected to modification conditions by means of a selective solvent for a homopolymer of alkenyl aromatic monomers is determined by such means as infrared spectrophotometry. The modification ratio is normally 1-200%, preferably 2-150%, more preferably 5-100%.

As polymerization conditions for implementing modification, any conditions of anionic polymerization, cationic polymerization, and radical polymerization can be selected. The preferable polymerization conditions are anionic polymerization conditions.

As an anionic polymerization initiator, it is possible to use any of the known ones including alkali metals such as lithium sodium and potassium and organic metal compounds each having a metal-carbon or a metal-nitrogen bond of an alkali metal or alkali earth metals such as magnesium, calcium, and strontium. Among them, an organic lithium compound is preferable, and various types of organic lithium compounds cited as examples that may be used for forming the aforementioned Ziegler-Natta catalyst. Accordingly, in the present invention, in effecting the copolymerization of propylene and a dialkenyl benzene compound and modification based on an alkenyl aromatic monomer, the same type of organometallic compound can be used. These anionic polymerization initiators may be used jointly with a nitrogen- or oxygen-containing basic compound, an alkoxide compound of an alkali metal, or the like.

As for alkenyl aromatic monomers, anionic polymerizable ones are used in all cased, and these anionic polymerizable monomers may be used singly or in a state in which two or more components are mixed, or may be used consecutively. (In other words, the grafter polymer chains of anionic polymerizable monomers may be homo, random or block polymer chains.

As for a polymerization solvent, it is possible to use the same solvent used in the copolymerization of propylene and dialkenyl benzene (accordingly, in such a case, the modification treatment can be implemented as a continuous process, following the copolymerization treatment). Although non-proton polar solvents, such as tetrahydrofuran, dioxane, ethyl ether, and pyridine, can be used, the use of a hydrocarbon solvent is preferable.

As for the polymerization temperature, the range of -78° C. to 150° C. is selected, but polymerization may be effected in the temperature range of 0° C. to 130° C. at atmospheric pressure or under pressure in the light of the workability. The reaction time is 0.1 to 10 hours, preferably 0.3 to 8 hours. In view of the efficiency of modification, it is preferred that modification is effected with the system set in a uniform state, but this is not an essential requirement.

The conversion of alkenyl aromatic monomers in a modified polymer product of propylene and a dialkenyl benzene compound copolymer (i.e., the ratio of a total of a polymer of alkenyl aromatic monomers collected by graft polymerization or homo- (or co-) polymerization to the alkenyl aromatic monomers supplied), is generally 90% or more. The content of a polymer of alkenyl aromatic monomers, i.e., a polymer obtained by graft polymerization or homo- or co-polymerization, to a component (c), i.e., a modified copolymer product, is conventionally set in the range of 5 to 90 wt%. In addition, as for the molecular weight of a polymer of alkenyl aromatic monomers, the number-average molecular weight of an non(graft)-bonded component obtained by solvent extraction, i.e., the homo- or co-polymer of alkenyl aromatic monomers, is generally $1 \times 10^3$ or more, preferably $2 \times 10^3$ to $40 \times 10^4$, more preferably $5 \times 10^3$ to $20 \times 10^4$. The weight composition, molecular weight and the degree of modification thereof can be varied depending on purposes. Namely, these factors can be controlled by such as the content of the dialkenyl benzene compound in the propylene-dialkenyl benzene compound copolymer, the ratio of the amount of alkenyl aromatic monomers used to that of propylene copolymer, the polymerization temperature and time in the modification stage, and the ratio between the amount of alkenyl aromatic monomer and that of a polymerization initiator for the monomer. As will be clarified in an example which will be described later, with respect to polypropylene in which dialkenyl benzene has not been copolymerized, even if alkenyl aromatic monomers are polymerized by using an anionic polymerization initiator, the polymer of anionic polymerizable monomers produces only homopolymers of anionic polymerizable monomers without undergoing graft polymerization, so that these homopolymers can be removed simply by selective solvent extraction.

In short, one of the preferable modification conditions of the alkenyl aromatic monomer-modified propylene-dialkenyl benzene compound copolymer is the anionic polymerization conditions, and the degree of modification, molecular weight, and the molecular structure of the modified polymer produced can be adjusted, as required, by appropriately selecting the type and amount of alkenyl aromatic monomer, a method of addition thereof, the type and amount of anionic polymerization initiator, a method of addition thereof, polymerization pressure, polymerization temperature, and polymerization time.

In addition, in the modification under such anionic polymerization conditions, it is estimated that, as described before, the alkenyl residue of the dialkenyl benzene residue in the propylene-dialkenyl benzene compound copolymer is anionic copolymerized with alkenyl aromatic monomers and produces a graft polymer of the propylene-dialkenyl benzene compound copolymer and the (co)polymer of alkenyl aromatic monomers. In the case of polymerization of the propylene-dialkenyl benzene compound copolymer, there is a possibility that some dialkenyl benzene groups are present at the ends of the copolymer. In such a case, a small amount of block copolymers are also included in the modified copolymer. In addition, in modification, there are cases where a homopolymer of alkenyl aromatic monomers not bonded to the propylene-dialkenyl benzene compound copolymer is produced.

Such nonbonded polymers may be extracted and removed prior to the blending of the final composition, or may be blended as they are. Furthermore, there is also a possibility that the polymer of alkenyl aromatic monomers are copolymerized with two or more dialkenyl benzene compounds. In such a case, it is conceivable that crosslinking takes place partially in the modified product and gel-like polymeric products may be produced. However, a small amount of gel-like polymeric products may be present in the final blend within a range that does not undermine the affinity improving effect and the moldability improving effect. The alkenyl aromatic monomer-modified propylene-dialkenyl benzene compound polymer modified under anionic polymerization conditions in the present invention may contain such forms of products. In addition, the degree of modification can be expressed by the ratio of the amount of the polymer of bonded alkenyl aromatic monomers to that of the propylene-dialkenyl benzene copolymer, as described before.

The other preferable polymerization conditions as conditions for effecting modification of the propylene-dialkenyl benzene compound copolymer are radical polymerization conditions. The alkenyl groups contained in the aforementioned propylene-dialkenyl benzene compound copolymer and alkenyl aromatic monomers are capable of undergoing radical copolymerization. Known radical polymerization initiators for vinyl polymerization can be used as polymerization initiators. For instance, it is possible to use such organic peroxides such as cyclohexanone peroxide, t-butylperoxybenzoate, methyl ethyl ketone peroxide, dicumyl peroxide, di-t-butyl peroxide, benzoyl peroxide, and t-butylperoxypivalate, as well as compounds such as azobisisobutyronitrile. The polymerization solvent and the polymerization conditions can be selected in the same way as the aforementioned anionic polymerization conditions. The degree of modification can be considered in the same way as modification under the anionic polymerization conditions. With respect to modification under the radical polymerization conditions, it is estimated that modification occurs through the graft copolymerization of alkenyl aromatic monomers in a radical polymerization mechanism with residual alkenyl groups in the propylene-dialkenyl benzene compound copolymer.

Component (d):Hydrogenated Block Copolymer Comprising Alkenyl Aromatic Compound Polymer block A and Conjugated Diene Compound Copolymer block B A hydrogenated block copolymer comprising an alkenyl aromatic compound polymer block A and a conjugated diene compound polymer block B can be added in the composition of the present invention.

A hydrogenated block copolymer used in the present invention is a block copolymer, provided with a structure having at least one chain block A derived from the alkenyl aromatic compound and at least one chain block B derived from the conjugated diene, respectively, in which the number of aliphatic unsaturated groups of a block B of an alkenyl aromatic compound-conjugated diene compound block copolymer is reduced due to hydrogenation. The arrangements of the block A and block B can be of a linear structure or a branched structure, and, among those having a branched structure, one having a radial teleblock structure is also included. In addition, a random chain derived from a random copolymerized portion of the alkenyl aromatic compound and the conjugated diene compound may be included in a part of such structures. Among such compounds, one having al linear structure is preferable, and one having a di-block structure is more preferable. Alkenyl aromatic compounds which can constitute the block A have a chemical structure expressed by the following formula:

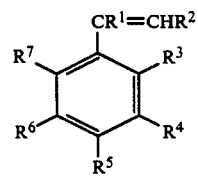

In the formula, $R^1$ and $R^2$ are selected from hydrogen and lower alkyl groups having 1 to 6 carbon atoms, $R^3$ to $R^4$ are selected from hydrogen, a lower alkyl group having 1 to 6 carbon atoms, chlorine, and bromine, and $R^5$, $R^6$ and $R^7$ are selected from hydrogen, a lower alkyl group or an alkenyl group having 1 to 6 carbon atoms, or $R^6$ and $R^7$ may be bonded to a hydrocarbyl group to form a naphthyl group.

Specific examples of alkenyl aromatic compounds include styrene, para-methylstyrene, α-methylstyrene, vinylxylene, vinyltoluene, vinylnapthalene, divinylbenzene, bromostyrene, and chlorostyrene. Among them, styrene, α-methylstyrene, para-methylstyrene, vinyltoluene, and vinylxylene are preferable, and sytrene is more preferable.

Specific examples of conjugated diene compounds include 1,3-butadiene, 2-methyl-1,3-butadiene, 2,3-dimethyl-1,3-butadiene, and pentadiene. Among them, 1,3-butadiene or 2-methyl-1,3-butadiene is preferable. Furthermore, lower olefin-based hydrocarbons such as ethylene, propylene and 1-butene, cyclopentadiene, or non-conjugated dienes may be included in small amounts in addition to such conjugated dienes.

The proportion of repeated units derived from an alkenyl aromatic compound in the hydrogenated copolymer of the alkenyl aromatic compound and the conjugated diene compound block is preferably in the range of 10 t 80 wt%, more preferably 15 to 60 wt%.

With respect to aliphatic chain portions in these block copolymers, the proportion of residual unhydrogenated, unsaturated bonds derived from the conjugated diene compound is preferably 20% or less, more preferably 10% or less. In addition, a proximately 25% or less of the aromatic unsaturated bonds derived from an alkenyl aromatic compound may be hydrogenated.

As for these hydrogenated block copolymers, in terms of the criteria of their molecular weight, those in which the value of the viscosity of a toluene solution at 25° C. is 3,000 to 30 CPS (concentration: 15 wt%) or 10,000 to 50 CPS (concentration: 20 wt%) are preferable. In the range greater than these values, difficulties are experienced in the moldability of the composition, and in the range smaller than these values the mechanical strength of the composition disadvantageously declines.

Numerous methods have been proposed as methods of producing copolymers of an alkenyl aromatic compound and a conjugated diene compound block. As typical methods, there are methods disclosed in, for example, Japanese Pat. Publication No. 23798/1965 and U.S. Pat. Nos. 3,595,942 and 4,090,996, in which block copolymerization is allowed to take place in an inert solvent by using a lithium catalyst or a Ziegler-Natta catalyst.

The hydrogenation treatment of the block copolymers is effected in an inert solvent in the presence of a hydrogenating catalyst in accordance with the method disclosed in, for instance, the specification of Japanese Pat. Publication No. 8704/1967, 6636/1968, or 20814/1971. In this hydrogenation, at least 50%, preferably 80% or more, of olefin-type double bonds in the polymer block B are hydrogenated, and 25% or less of aromatic unsaturated bonds in the polymer block A are hydrogenated.

These hydrogenated products are commercially available from Shell Kagaku K. K. as the brandname of "Kraton-G" under the code names of, for instance, GX-1701 and G-1652.

In the present invention, pelletized substances having a diameter of 10 μto 10 mm or powders are used.

Ratio of Composition of Each Component

Another factor restricting the resin composition in accordance with the present invention is the quantitative ratio of the aforementioned components (a), (b) and (c). The selection of the quantitative ratio is determined on the basis of the performance of the final molded article required in its application. The individual properties including moldability, mechanical strength, and high-temperature rigidity can, in many cases, be adjusted by the above-described characteristics of the respective components and by increasing or decreasing the ratio of their presence. However, the relations of the properties which are considered to be mutually incompatible from a general consideration of a manifesting mechanism as in the case of the melt moldability and high-temperature rigidity are difficult to be made compatible to a high degree. For practical purposes, the selection of the quantitative ratio is generally carried out from the viewpoint of harmonizing the various properties of the moldability, mechanical strength and high-temperature rigidity.

When a polyphenylene ether resin and a styrene resin are made to coexist in a final composition as the component (a), the ratio of the two volumes is desirably 40 to 100 wt% of a polyphenylene ether resin and 0 to 60 wt% of a styrene resin, and 60 to 100% is preferably adopted for the polyphenylene ether resin.

The quantitative ratio among such a component (a), the component (b), i.e., the crystalline polypropylene resin, and the component (c), i.e., an alkenyl aromatic monomer modified propylene-dialkenyl benzene compound copolymer is as follows: 30 to 70 wt parts is used for the component (a), preferably 40 to 60 wt parts; 30 to 70 wt parts is used for the component (b), preferably 40 to 60 wt parts; and 1 to 40 wt parts with respect to a total volume of 100 wt parts of the component (a) and the component (b) is used for the component (c), preferably 5 to 30 wt parts, more preferably 10 to 20 wt parts. In other words, if the weight ratio between the component (a) and the component (b) becomes greater than 7/3, among the characteristic features, the high-temperature rigidity can be improved, but the melt moldability and the resistance to organic solvents decline, so that the applications are restricted. On the other hand, if the ratio between the component (a) and the component (b) becomes smaller than 3/7, the melt moldability can be improved, but the high-temperature rigidity declines, so that the performance as an engineering resin becomes insufficient. If the amount of the presence of the component (c) is 1 wt part or less, the composition fails to exhibit an effective affinity improving effect, while if the amount is 40 wt parts or more, the affinity improving effect is saturated, and the high-temperature rigidity declines to the contrary.

In addition, when the component (d) is added, 1 to 40 wt% with respect to a total amount of 100 wt parts of the components (a) and (b) is used for the component (d), or preferably 5 to 30 wt%, more preferably 10 to 20 wt%, is used.

Mixing Method for Composition

The resin composition of the present invention can be obtained by a method in which the aforementioned components are mixed by using a mixer of various kinds, such as a single extruder, a twin extruder, and Banbury mixer, or a method in which, after solutions or suspensions of the components are mixed, the solvents are removed, or, they are precipitated with addition of a common non-solvent, filtered, and collected. As for the order of mixing, any procedure may be used insofar as possible. From the standpoint of economic efficiency, it is preferable to mix all the components at the same time. If mixing is effected by the melt mixing process, a method is also known in which mixing is effected consecutively, beginning with those having higher viscosities. In addition, if a preplasticizing injection machine or the like is used, it is possible to effect all or part of the mixing operation simultaneously at the time of molding.

Additional Components

In the present invention, in addition to the aforementioned essential components, it is possible to add other additional components, as required, within the range which does not impair the advantages of the present invention. For instance, as additional components, it is possible to use those additives that are known with polypropylene resins, including oxidation inhibitor, weather resistance improving agent, nucleation agent, flame-retardent agent, and slip agent as well as those additives that are known with polyphenylene ether resins and styrene resins, including oxidation inhibitor, weather resistance improving agent, plasticizer, fluidity improving agent, and release agent. Furthermore, addition of organic and inorganic fillers, reinforcing agents, particularly glass fibers, mica, talc, sedimenting calcium carbonate, silica, wollastonite, titanic acid potassium wisker, etc. are effective improving the rigidity, heat resistance, dimensional accuracy, and dimensional stability. For practical purposes, as various coloring agents and dispersants thereof, it is possible to use such known ones as polyolefin wax, polystyrene wax, ester compounds, and acid amide compounds. In addition, the addition of rubber components, particularly, styrene-butadiene copolymer rubber, especially styrene-butadiene random copolymer rubber, styrene-butadiene block copolymer are effective in improving the impact strength, and the amount of rubber to be compounded is 0 to 30 wt parts with respect to the total amount of the aforementioned components (a), (b) and (c), preferably 5 to 20 wt parts. If the amount of the rubber component added exceeds 30 wt parts, the rigidity, which is one of the characteristic features of the composition of the present invention, declines, with the result that the harmony of its performance as a molding material is lost.

EXAMPLES

A description will now be given of examples in accordance with an embodiment of the present invention, but the scope of the present invention is not to be particularly restricted thereby.

Illustrated below is an example of producing the component (3), a modified copolymer of propylene and dialkenyl benzene compound copolymer with alkenyl aromatic monomers (hereafter this copolymer may be referred to as a modified copolymer).

[REFERENCE EXAMPLE 1]

Production of Modified Copolymer (A)

(1) Production of Propylene-Divinylbenzene Copolymer 500 ml of n-heptane which was sufficiently dehydrated and deoxidized after being subjected to vacuum-propylene substitution a number of times, 20 ml of divinylbenzene (made by Tokyo Kasei Co., Ltd, a mixture of m-compound and p-compound, the divinylbenzene content 53 wt%), 234 mg of diethylaluminum chloride, and 100 mg (Al/Ti=3 molar ratio) of titanium trichloride (made by Toyo Stauffer Corporation, TTA-12) were introduced in that order into a stainless steel autoclave with an internal capacity of 1 l provided with stirring and temperature controlling devices, and 450 ml of hydrogen was then added to start copolymerization of propylene and divinylbenzene.

Copolymerization was carried out under the propylene pressure of 7 kg/cm$^2$G at 65° C. for three hours.

Upon completion of copolymerization, residual monomers were purged, the polymer slurry was filtered out, and a copolymerized powder polymer of 108.8 g was obtained (catalyst activity: 3,500 g copolymer/gTi, MFR=5.0 g/10 mins.; stereoregularity determined through boiling heptane extraction was 98.1%).

(2) Production of Styrene Modified Copolymers 4.0 g of the propylene-divinylbenzene copolymer obtained in step (1) above was introduced into a three-necked flask with an internal capacity of 300 ml substituted by a nitrogen gas. Then, after vacuum heating was performed for two hours at 80° C., 100 ml of refined toluene was added to it in a nitrogen gas atmosphere, and when the temperature reached 110° C., 8.8 ml (8.0 g) of styrene monomer was further added. Subsequently, 4.77 millimol l of n-butyllithium (hexane solution) was dropped slowly into the mixture, and anionic copolymerization of styrene was carried out for one hour at a temperature of 110° C. Upon completion of this copolymerization, a polymeric product was precipitated using a large excess amount of methanol and was then allowed to dry, thereby obtaining 11.8 g of a polymer. (If it is assumed that the entire amount of the propylene copolymer was recovered, the conversion rate of styrene monomer is 97.5%.) This resultant modified copolymer is hereafter referred to as the modified copolymer (A).

(3) Analysis of Polymer

The content of the polymerized divinylbenzene in the propylene-divinylbenzene copolymer was measured by the ultraviolet spectrum method. The content was 0.40 wt%.

In addition, according to gel permeation chromatography (GPC), the polystyrene-equivalent number-average molecular weight ($\overline{Mn}$) of this copolymer was $6.34 \times 10^4$, and the weight-average molecular weight ($\overline{Mw}$) thereof was $41.1 \times 10^4$.

In the infrared (IR) spectrum of the styrene modified propylene-divinylbenzene copolymer, an absorption spectrum peculiar to polystyrene was observed in the vicinity of 1,600 cm$^{-1}$ and 700 cm$^{-1}$. When Soxhlet extraction was performed using 3.01 g of the copolymer obtained and using methyl ethyl ketone (MEK) as an extracting solvent for five hours, 1.90 g of an MEK insoluble polymer was obtained. When the content of polystyrene in this MEK insoluble polymer was measured quantitatively by IR method, the content was 40.5 wt%, and the aforementioned grafting ratio was 68%.

Accordingly, the graft efficiency of styrene monomer defined below was 39%.

Graft efficiency=[bonded polystyrene (weight)

not extracted by an extracting solvent (MEK) / all polystyrene (weight) polymerized in the modification reaction]×100

The apparent molecular weight of this MEK insoluble polymer determined by measurement by GPC (gel permeation chromatography) was $\overline{Mn}=7.37\times 10^4$, $\overline{Mw}=54.4\times 10^4$. Incidentally, when the insoluble polymer obtained through MEK extraction was dissolved in boiling xylene (1.90 g/100 ml xylene), and was then precipitated in acetone of a four-fold volume, the soluble polymer fraction was 5 wt% or less of the MEK insoluble polymer, and it was found that nonbonded (homo) polystyrene was substantially extracted by MEK.

[REFERENCE EXAMPLE 2]

Production of Modified Copolymer (B)

A propylene-divinylbenzene copolymer was produced under the same conditions as [Reference Example 1] excepting that the amount of divinylbenzene introduced was changed to 10 ml. The same copolymerization treatment was repeated twice, and a total of 280 g of a polymer was obtained. The catalyst activity was 4,630 g copolymer / g Ti; MFR was 9.5 g/10 min.; and the content of copolymerized divinyl benzene was 0.13 wt%.

A modified copolymer was prepared by a procedure similar to that of [Reference Example 1] excepting that a 5-1 flask was used, 160 g of the copolymer was used, 4,000 ml of refined xylene was used instead of refined toluene, 3 ml of a hexane solution of 1.6 mol/l of n-butyllithium and 320 g styrene monomer were used. The polymer obtained by drying was subjected to Soxhlet extraction by using methyl ethyl ketone (MEK) to remove the soluble polymer, and 235 g of a sufficiently dried modified copolymer (B) was obtained. The content of the polystyrene component in the modified polymer was 25 wt%.

As for the polystyrene-equivalent molecular weight determined by the GPC method, the number-average molecular weight $\overline{Mn}$ was $3.5\times 10^4$, while the weight-average molecular weight $\overline{Mw}$ was $38.9\times 10^4$. In addition, it was verified by an infrared absorption spectrum that the MEK soluble polymer was polystyrene, and the molecular weight thereof measured by the GPC method was $\overline{Mn}=2\times 10^4$, and $\overline{Mn}=9.6\times 10^4$.

[REFERENCE EXAMPLE 3]

Preparation of Modified Copolymer (C)

The operation was performed in the same manner as that for [Reference Example 1] excepting that divinylbenzene was not added, and a styrene modified polypropylene, i.e. a modified copolymer (C), was obtained. The polystyrene content in the insoluble polymer obtained by extraction processing using MEK was 2.5 wt% or less, which is below a quantitative limitation of measurement. The molecular weight of the insoluble polymer determined according to the GPC method was $\overline{Mn}=5.0\times 10^4$, $\overline{Mw}=36.4\times 10^4$, and the ratio of the insoluble polymer was 31 wt%. It can be considered that the graft addition of polystyrene did not practically occur.

[REFERENCE EXAMPLE 4]

Preparation of Modified Copolymer (D)

100 g of propylene-divinylbenzene copolymer powders polymerized under the same conditions as those of [Reference Example 2] was obtained. As aqueous media, 600 ml of pure water, 18 g of calcium triphosphate, and 18 mg of sodium dodecylbenzenesulfonate were mixed in the 5 l autoclave to allow 100 g of the copolymer to be suspended by agitation. 1.4 g of t-butylperoxypivalate (a 70 % product, made by Nippon Oil & Fat Co., Ltd.) and 0.5 g of benzoylperoxide were separately dissolved with 100 g of styrene, and the resultant mixture was added to the suspension. After the inside of the system was substituted with nitrogen, the temperature was raised to 50° C. After agitation was carried out for three hours, the temperature was then raised to 75° C., and polymerization was effected for two hours, the temperature was then raised further to 90° C. and held for three hours, thereby completing polymerization. After cooling, the solid polymer was removed, washed, and then allowed to dry. The amount recovered was 195 g. This was then subjected to Soxhlet extraction using methyl ethyl ketone to remove the soluble polymer. After the insoluble polymer was dried, 123 g of a modified copolymer was obtained. The polystyrene content in this modified copolymer was 20 wt%. This copolymer will be hereafter referred to as the modified copolymer (D).

[Preparation of Test Pieces for Evaluation and Method of Evaluation]

(1) Mixing of Resin Composition

Components of the composition in a predetermined ratio were measured in such a manner that the total amount would become 45 g, and the mixture was melted and mixed at 280° C. for five minutes in a Laboplustmill (made by Toyo Seiki Mfg. Co., Ltd.). Unless otherwise stated, 0.2 part of 2,6-di-t-butyl-p-cresol and 0.1 part of tetrakis(methylene(3,5-di-t-butyl-4-hydroxyhydrocinnamate))methane were added to the polypropylene resin as stabilizers at the mixing.

(2) Preparation of Test Pieces

A sheet having a thickness of 2 mm was prepared by subjecting the resin composition to compression molding at 280° C., and test pieces of a predetermined size were cut out.

(3) Method of Evaluation

As an index of moldability, MFR (melt flow rate) at 280° C. and under a 5 kg load was measured in accordance with JIS-K 7210. As for rigidity, a flexural strength test was carried out at 23° C. in accordance with JIS-K 7106 and ASTM-D747. In addition, for the purpose of obtaining an index of heat resistance, moduli in shear G' at 80° C. were measured at an angular frequency of 1 Hz using a mechanical spectrometer made by Rheometrics Co., Ltd. As for the impact strength, three 2 mm-wide test pieces were superposed on each other and Izod impact strengths were measured in accordance with JIS-K 7110.

(EXAMPLE 1, COMPARATIVE EXAMPLES A, B, and C)

Table 1 shows the evaluated properties concerning the formulation of the blended compositions. The results of objects evaluated similarly for the purpose of comparison are also shown (Comparative Examples A, B, and C). The compositions in accordance with the present invention exhibit a favorable balance of physical properties with improved impact strength. In addition, to evaluate the resistance to organic solvents, the compositions were immersed in a mixed solvent of toluene and hexane at a rate of 1 : 9 for three minutes in accordance with the ¼ ellipse method (SPE Journal, 667 (1962)) of Bergen so as to determine the critical strain.

The critical strain was 1.5%, and since that of the poly-2,6-dimethyl-phenylene ether alone is 0.5% or less, an improving effect was verified.

TABLE 1

|  | Example 1 | Comparative Examples | | |
|---|---|---|---|---|
|  |  | A | B | C |
| Composition (wt parts) | | | | |
| PPE-1 *1 | 60 | 100 | — | 60 |
| Polypropylene *2 | 40 | — | 100 | 40 |
| Modified copolymer (A) | 30 | — | — | — |
| Properties | | | | |
| MFR (g/10 min.) | 12.0 | <0.1 | — | 1.5 |
| Flexural strength (23° C.) (kgf/cm²) | 14,700 | 19,000 | 12,500 | 11,500 |
| Modulus in shear (23° C.) | $9.0 \times 10^9$ | $9.3 \times 10^9$ | $7.3 \times 10^9$ | $8.9 \times 10^9$ |
| (dyne/cm²) (80° C.) | $4.4 \times 10^9$ | $8.8 \times 10^9$ | $2.2 \times 10^9$ | $4.9 \times 10^9$ |
| Izod impact strength (23° C.) (kgf · cm/cm) | 4.7 | 3.8 | 3.3 | 2.5 |

*1 Poly-2,6-dimethylphenylene ether trial-manufactured by Mitsubishi Petrochemical Co., Ltd., intrinsic viscosity in 30° C. chloroform: 0.47 dl/g
*2 Mitsubishi Polypro MA 6 made by Mitsubishi Petrochemical Co., Ltd. (MFR under a 2.16 kg load at 230° C.: 1.6)

(COMPARATIVE EXAMPLE D)

The properties were evaluated with respect to compositions obtained in a similar manner to Example 1 except that the modified copolymer was changed to the modified copolymer (C). MFR was 22 (g/10 min.), the Izod impact strength was 1.5 (kgf/cm²), and the improving effect of the styrene modified copolymer was not verified at all with respect to the impact strength.

(EXAMPLES 2 TO 4, COMPARATIVE EXAMPLE E)

The results in cases where poly-2,6-dimethyl-1,4-phnylene ether and the types of polypropylene resin were changed and a rubber component was added are shown in Table 2 together with Comparative Example E. Furthermore, in order to examine the state of two-phase dispersion of polyphenylene ether and polypropylene, cross sections of test pieces of Example 2 and Comparative Example E were observed using a scanning type electron microscope. In the cases where the modified copolymer (B) was blended, uniform dispersion of polyphenylene ether close to a spherical shape of 1 to 3 microns was verified. In the cases where the modified copolymer was not present, dispersion of irregular shapes of 10 microns or more was observed in large quantities.

TABLE 2

|  | Examples | | | Comparative Example |
|---|---|---|---|---|
|  | 2 | 3 | 4 | E |
| Composition (wt parts) | | | | |
| PPE-1 | 50 | — | 50 | 50 |
| PPE-2 *3 | — | 50 | — | — |
| Polypropylene *4 | 50 | 50 | 50 | 50 |
| Modified copolymer (B) | 15 | 15 | 15 | — |
| Ethylene propylene rubber *5 | — | — | 15 | — |
| Properties | | | | |
| MFR (g/10 min.) | 8.5 | 25 | 7.1 | 1.7 |
| Flexural strength (23° C.) (kgf/cm²) | 14,340 | 15,240 | 12,190 | 10,880 |
| Izod impact strength (23° C.) (kgf · cm/cm) | 4.3 | 2.8 | 7.2 | 1.5 |

*3 Poly-2,6-dimethyl-1,4-phenylene ether trial-manufactured by Mitsubishi Petrochemical Co., Ltd.. Intrinsic viscosity in 30° C. chloroform: 0.28 dl/g
*4 Mitsubishi Polypro TA 6 made by Mitsubishi Petrochemical Co., Ltd. (MFR under a 2.16 kg load at 230° C.: 0.6 g/10 min)
*5 EP07 manufactured by Japan Synthetic Rubber Co., Ltd.

(EXAMPLES 5 TO 7, COMPARATIVE EXAMPLE F)

Table 3 shows the results in which high impact polypropylenes (propylene-ethylene block copolymers) were used as the polypropylene resin.

High values can be noted for the Izod impact strength. In addition, it was verified that addition of styrene rubber further improves the impact strength.

TABLE 3

|  | Examples | | | Comparative Example |
|---|---|---|---|---|
|  | 5 | 6 | 7 | F |
| Composition (wt parts) | | | | |
| PPE-1 | 50 | 50 | 50 | 50 |
| Propylene-ethylene block copolymer *6 | 50 | 50 | 50 | 50 |
| Modified copolymer (B) | 15 | 15 | 15 | — |
| Styrene rubber | — | 15 *7 | 15 *8 | — |
| Properties | | | | |
| MFR (g/10 min.) | 16.0 | 2.6 | 11.4 | 3.0 |
| Flexural strength (23° C.) (kgf/cm²) | 13,460 | 8.660 | 5.860 | 9,910 |

TABLE 3-continued

|  | Examples | | | Comparative Example |
|---|---|---|---|---|
|  | 5 | 6 | 7 | F |
| Izod impact strength (23° C.) (kgf · cm/cm) | 6.9 | 5.7 | 9.8 | 2.3 |

*6 Mitsubishi Polypro BC8D made by Mitsubishi Petrochemical Co., Ltd. (MFR under a 2.16 kg load at 230° C.: 1.2 g/10 min)
*7 JSR 1502 (styrene butadiene random copolymer) manufactured by Japan Synthetic Rubber Co., Ltd.
*8 Kraton G1652 (hydrogenated styrene butadiene block copolymer) made by Shell Kagaku K. K.

(EXAMPLE 8)

Measurements were made in the same way as (Example 5) excepting that the modified copolymer (B) was changed to the modified copolymer (D). MFR was 6.5 g/10 min., the flexural strength at 23° C. was 9,800 kgf/cm$^2$, and the Izod impact strength was 4.6 (kgf/cm). Hence, the improving effect of the present invention was verified.

What is claimed is:

1. A resin composition consisting essentially of the following components (a), (b) and (c):
   (a) 30 to 70 parts by weight of a resin comprising 40 to 100 wt% of a polyphenylene ether resin and 0 to 60 wt% of a styrene resin;
   (b) 30 to 70 parts by weight of a crystalline propylene resin; and
   (c) 1 to 40 parts by weight of a modified propylene-dialkenylbenzene compound copolymer with respect to a total of 100 parts by weight of said components (a) and (b) which is polymerized by using a Ziegler-Natta catalyst and obtained by subjecting an alkenyl aromatic monomer to copolymerization with a copolymer whose dialkenylbenzene compound content is 0.001 to 10 wt% in the presence of a polymerization initiator.

2. A composition according to claim 1, wherein said component (a) is 40 to 60 parts by weight, said component (b) is 40 to 60 parts by weight, and said component (c) is 5 to 30 parts by weight with respect to a total of 100 parts by weight of said components (a) and (b).

3. A composition according to claim 1, wherein said component (a) is 40 to 60 parts by weight, said component (b) is 40 to 60 parts by weight, and said component (c) is 10 to 20 parts by weight with respect to a total of 100 parts by weight of said components (a) and (b).

4. A composition according to claim 1, wherein said crystalline propylene resin is polypropylene.

5. A composition according to claim 1, wherein said crystalline propylene resin is a propylene-ethylene copolymer in which propylene is a component having a majority of quantity (weight).

6. A composition according to claim 5, wherein said crystalline propylene resin is a propylene-ethylene block copolymer whose propylene content is 99 to 70 wt%.

7. A composition according to claim 1, wherein said crystalline propylene resin is a copolymer of propylene and α-olefin having 4 to 8 carbon atoms in which propylene is a component having a majority of quantity (mol).

8. A composition according to claim 7, wherein said crystalline propylene resin is a propylene-ethylene copolymer containing 99.9 to 80 wt% of propylene.

9. A composition according to claim 1, wherein said propylene-dialkenylbenzene compound copolymer contains 0.05 to 5 wt% dialkenyl benzene.

10. A composition according to claim 1, wherein said component (c) is one in which a polymer of said alkenyl aromatic monomers bonded with said propylene-dialkenylbenzene compound copolymer is 1 to 200 parts with respect to 100 parts of said propylene-dialkenylbenzene compound copolymer.

11. A composition according to claim 1, wherein the amount of a polymer of said alkenyl aromatic monomers in said component (c) is 5 to 90 wt%.

12. A resin composition consisting essentially of:
   (a) 30 to 70 parts by weight of a resin comprising 40 to 100 wt% of a polyphenylene ether resin and 0 to 60 wt% of a styrene resin;
   (b) 30 to 70 parts by weight of a crystalline propylene resin;
   (c) 1 to 40 parts by weight of a modified propylene-dialkenylbenzene compound copolymer with respect to a total of 100 parts by weight of said components (a) and (b), which is polymerized by using a Ziegler-Natta catalyst and obtained by subjecting an alkenyl aromatic monomer to copolymerization with a copolymer whose dialkenylbenzene compound content is 0.001 to 10 wt% in the presence of a polymerization initiator; and
   (d) 1 to 40 parts by weight of a hydrogenated block copolymer comprising an alkenyl aromatic compound polymer block A and a conjugated diene compound polymer block B.

* * * * *